(12) United States Patent
Yamashita

(10) Patent No.: US 8,345,214 B2
(45) Date of Patent: Jan. 1, 2013

(54) COOLING DEVICE OF ELECTRONIC APPARATUS AND LIQUID CRYSTAL PROJECTOR EQUIPPED WITH SAME INCLUDING DUCTS COMMUNICATING WITH RESPECTIVE OPENINGS

(75) Inventor: Eisuke Yamashita, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 364 days.

(21) Appl. No.: 12/733,741

(22) PCT Filed: Oct. 6, 2008

(86) PCT No.: PCT/JP2008/068163
§ 371 (c)(1),
(2), (4) Date: Mar. 18, 2010

(87) PCT Pub. No.: WO2009/044911
PCT Pub. Date: Apr. 9, 2009

(65) Prior Publication Data
US 2010/0188633 A1    Jul. 29, 2010

(30) Foreign Application Priority Data
Oct. 5, 2007   (JP) ................................ 2007-262206

(51) Int. Cl.
*G02F 1/1333*   (2006.01)
*F28F 7/00*   (2006.01)
(52) U.S. Cl. ...................................... 349/161; 165/185
(58) Field of Classification Search .......... 349/161–165; 165/286, 104.28; 236/49; 361/679.5, 679.48, 361/687, 695
See application file for complete search history.

(56) References Cited

U.S. PATENT DOCUMENTS

| 6,334,686 | B1 | 1/2002 | Shiraishi et al. |
| 6,481,854 | B1 | 11/2002 | Sugawara et al. |
| 7,167,359 | B2 * | 1/2007 | Wendel et al. ............ 361/679.36 |
| 7,633,751 | B2 * | 12/2009 | Shinotou et al. ........... 361/679.5 |
| 2010/0118279 | A1 * | 5/2010 | Itsuki et al. ..................... 353/54 |

FOREIGN PATENT DOCUMENTS

| JP | 11-295814 A | 10/1999 |
| JP | 2000-124649 A | 4/2000 |
| JP | 2000-194073 A | 7/2000 |
| JP | 2000-231154 A | 8/2000 |

(Continued)

*Primary Examiner* — Akm Ullah
(74) *Attorney, Agent, or Firm* — McGinn IP Law Group, PLLC

(57) ABSTRACT

A cooling device is provided that can thin a boundary layer and thus obtain the effect of sufficiently improving the heat transfer coefficient. The cooling device for an electronic apparatus that has a plurality of members juxtaposed such that the surfaces of the members confront each other, the surface of at least one member of these members having a heat discharge surface from which heat is discharged, includes: a duct (100) equipped with an opening (100*a*) whereby a first air flow emitted from the opening (100*a*) flows in a first direction along the heat discharge surface, and a duct (101) equipped with an opening (101*a*) whereby a second airflow emitted from the opening (101*a*) flows along the heat discharge surface in a second direction that intersects with the first direction. Taking as a boundary a line (200*c*) that passes through the center (200*a*) of the heat discharge surface, the center of the opening (101*a*) is located on the side opposite the side in which the opening (100*a*) is provided.

29 Claims, 16 Drawing Sheets

FOREIGN PATENT DOCUMENTS

| | | |
|---|---|---|
| JP | 2001-209126 A | 8/2001 |
| JP | 2001-318361 A | 11/2001 |
| JP | 2003-43444 A | 2/2003 |
| JP | 2004-61894 A | 2/2004 |
| JP | 2005-338236 A | 12/2005 |
| JP | 2006-330380 A | 12/2006 |
| JP | 2007-58242 A | 3/2007 |

* cited by examiner

COOLING DEVICE OF ELECTRONIC APPARATUS AND LIQUID CRYSTAL PROJECTOR EQUIPPED WITH SAME INCLUDING DUCTS COMMUNICATING WITH RESPECTIVE OPENINGS

TECHNICAL FIELD

The present invention relates to a cooling device that is mounted in an electronic apparatus such as a liquid crystal projector, and more particularly relates to a cooling device for cooling the surface of parts that generate heat.

BACKGROUND ART

A liquid crystal projector includes: a plurality of dichroic mirrors for separating the light of luminous flux from a light source into the luminous flux of each of the colors red (R), green (G), and blue (B); three liquid crystal panels upon which is irradiated the luminous flux of each color that was color-separated; a color-synthesizing prism for color synthesis of image light of each color that is modulated by spatial arrangement in each liquid crystal panel; and projection optics for projecting the image light that has been color-synthesized onto a screen.

A liquid crystal panel is provided with a plurality of liquid crystal cells arranged in matrix form, and is further provided with a light-blocking region referred to as a black matrix, each cell being surrounded by the light-blocking region. A liquid crystal cell is a construction in which the space between two glass substrates, arranged such that surfaces on which transparent electrodes are formed confront each other, is filled with a liquid crystal material, and is capable of blocking or transmitting incident light by supplying voltage to the transparent electrodes to thus control the orientation of the liquid crystal molecules. When light is blocked by a liquid crystal cell, the liquid crystal molecules absorb the light, whereby the liquid crystal panel generates heat. In addition, the liquid crystal panel generates heat due to the absorption of light by the black matrix. The heat generation of the liquid crystal panel in some cases causes damage to the alignment film of the liquid crystal cells.

In addition, when a liquid crystal panel that operates in the TN (Twisted Nematic) mode is used as the liquid crystal panel, sheet polarizers are provided on the incident surface side and emission surface side of the liquid crystal panel. These sheet polarizers transmit only light having a predetermined polarity component (for example, S-polarized light) and absorb other light. The absorption of light causes further heat generation in the sheet polarizers. The heat generation of the sheet polarizers in some cases causes a marked reduction of the polarizing selectivity characteristic of the sheet polarizers.

In response, cooling devices have been proposed for cooling liquid crystal panels and sheet polarizers. As technology related to the present invention, various liquid crystal projectors that incorporate such cooling devices are next described.

As an example of the related art, FIG. 1A is an external view of a liquid crystal projector and FIG. 1B is a perspective view showing the internal construction of the liquid crystal projector shown in FIG. 1A. FIG. 2 is a schematic view showing the configuration of the cooling device that is incorporated in this liquid crystal projector.

As shown in FIGS. 1A, 1B, and 2, liquid crystal unit 2, cooling fan 3, air-cooling ducts 4, light source 5, reflector 6, lamp cooling fan 7, lamp cooling duct 8, exhaust fan 9, power supply unit 10, and projection lens 11 are provided in the case of liquid crystal projector 1.

Light from light source 5 is reflected by reflector 6 and irradiated into liquid crystal unit 2 as parallel luminous flux. Liquid crystal unit 2 is provided with three liquid crystal panels that are each irradiated by luminous flux of each color that is color-separated into red (R), green (G), and blue (B) by a plurality of dichroic mirrors, and by a color-synthesizing prism for color synthesizing the image light of each color that has been modulated by the spatial arrangement by each liquid crystal panel. A sheet polarizer is provided on the incident surface side and emission surface side of each liquid crystal panel. Image light that has been color-synthesized by the color-synthesizing prism is projected onto a screen by projection lens 11.

Lamp cooling fan 7 and lamp cooling duct 8 are means for cooling light source 5. The airflow produced by lamp cooling fan 7 passes by way of lamp cooling duct 8 to reach light source 5. Cooling fan 3 and air-cooling duct 4 are means for cooling liquid crystal unit 2. The airflow generated by cooling fan 3 passes through air-cooling duct 4 to reach liquid crystal unit 2. Exhaust fan 9 exhausts air that is inside the housing to the outside.

FIG. 3A is an exploded perspective view showing the actual construction of a cooling device that cools liquid crystal unit 2, and FIG. 3B is a schematic sectional view for explaining the cooling operation in the cooling device shown in FIG. 3A.

As shown in FIGS. 3A and 3B, cooling device 15 includes air-cooling duct 4 and cooling fan 3. Air-cooling duct 4 is provided with a plurality of exhaust ports 17 for directing the airflow from cooling fan 3 toward liquid crystal unit 2. Liquid crystal unit 2 is arranged above exhaust ports 17.

Sheet polarizer 12 is arranged on the incident surface side of each liquid crystal panel 13 that makes up liquid crystal unit, and sheet polarizer 14 is arranged on the emission surface side (color-synthesizing prism side). Exhaust ports 17 are provided at each of the points made up from liquid crystal panel 13 and sheet polarizers 12 and 13.

As shown in FIG. 3B, ventilation air 16 from cooling fan 3 flows in air-cooling duct 4 and is directed toward liquid crystal unit 2 from each of exhaust ports 17. The airflow supplied from exhaust ports 17 cools liquid crystal panel 13 and sheet polarizers 12 and 14 by passing through each of the gaps of liquid crystal panel 13 and sheet polarizers 12 and 14.

JP-A-H11-295814 (hereinbelow referred to as Patent Document 1) discloses another form of a cooling device for cooling a liquid crystal unit. FIG. 4 is a schematic view showing the configuration of this cooling device.

Referring to FIG. 4, ventilation air 16 from cooling fan 3 flows between sheet polarizer 12 and liquid crystal panel 13 and between liquid crystal panel 13 and color-synthesizing prism 35. Flow-directing plate 39 is provided on a portion of the cooling fan 3 side of a member for holding color-synthesizing prism 35. By changing the direction of ventilation air 16 by means of flow-directing plate 39 such that ventilation air 16 from cooling fan 3 is directed toward the surface of liquid crystal panel 13, an improvement in the cooling efficiency of liquid crystal panel 13 can be achieved.

JP-A-2001-318361 (hereinbelow referred to as Patent Document 2) discloses yet another form of a cooling device for cooling a liquid crystal unit. FIG. 5 is a schematic view showing the configuration of this cooling device.

Referring to FIG. 5, two protruding members 41 are provided along the confronting rims of holding frame 40 of liquid crystal panel 13. Each protruding member 41 is a plateshaped member and is controlled such that air supplied from duct exhaust port 42 flows in a fixed direction, whereby almost all air supplied from duct exhaust port 42 flows along the surface of liquid crystal panel 13 and thus improves cooling efficiency.

JP-A-2004-061894 (hereinbelow referred to as Patent Document 3) discloses yet another form of a cooling device for cooling a liquid crystal unit. FIG. 6 is a schematic diagram showing the configuration of this cooling device.

Referring to FIG. 6, slot 43 is formed in a portion of holding frame 40 of liquid crystal panel 13 that faces the airflow channel between liquid crystal panel 13 and sheet polarizer 14. The provision of slot 43 increases the width of the airflow channel (the widths shown by X and Y in FIG. 6), whereby the amount of airflow increases.

JP-A-2000-124649 (hereinbelow referred to as Patent Document 4) discloses yet another form of a cooling device for cooling a liquid crystal unit. FIGS. 7A and 7B are figures for explaining the configuration of this cooling device, FIG. 7A being an upper plan view and FIG. 7B being a side sectional view.

Referring to FIGS. 7A and 7B, air-guiding plate 44 having a U-shaped profile is installed between color-synthesizing prism 35 and sheet polarizer 12 arranged to confront each other with liquid crystal panel 13 interposed. The airflow from cooling fan 3 passes between color-synthesizing prism 35 and liquid crystal panel 13 and then is turned around by air-guiding plate 44. The airflow that was turned around by air-guiding plate 44 passes between liquid crystal panel 13 and sheet polarizer 12. This configuration enables the suppression of the occurrence of variations in temperature produced in the surface of liquid crystal panel 13.

Patent Document 4 further discloses a modification of the above-described cooling device. FIGS. 8A and 8B are figures for describing this modification, FIG. 8A being an upper plan view and FIG. 8B being a side sectional view. In this modification, cooling fan 3a is arranged below liquid crystal panel 13 and cooling fan 3b is arranged above liquid crystal panel 13. The airflow from cooling fan 3a passes between color-synthesizing prism 35 and liquid crystal panel 13. The airflow from cooling fan 3b passes between liquid crystal panel 13 and sheet polarizer 12. This modification can suppress the occurrence of variations in temperature that occur on the surface of liquid crystal panel 13.

JP-A-2001-209126 (hereinbelow referred to as Patent Document 5) discloses yet another form of a cooling device for cooling a liquid crystal unit. FIG. 9 is a sectional view giving a schematic representation of the configuration of this cooling device.

Referring to FIG. 9, the cooling device has an internal circulation portion provided with circulation duct 45 in which air flow generated by cooling fan 3a circulates and an external circulation portion provided with air circulation duct 46 in which air flow generated by cooling fan 3b circulates. Outside air is taken into the external circulation portion by cooling fan 3b. Air taken in by cooling fan 3b cools the internal circulation portion by flowing along the outer surfaces of circulation duct 45.

DISCLOSURE OF THE INVENTION

Typically, when a fluid flows in a fixed direction along the surface of a flat plate, two states of flow, laminar flow and turbulent flow, which result from conditions such as the speed or viscosity of the flow, occur in a boundary layer that is formed in the location of flow on the surface of the flat plate, but in either case, the heat transfer coefficient drops when the boundary layer is thick and the radiation of heat from the surface of flat plate cannot be efficiently realized. As a result, to release heat from the surface of a flat plate at high efficiency, it is important to thin (reduce the film thickness of) the boundary layer to improve the heat transfer coefficient.

However, a construction that can reduce the film thickness of the boundary layer is not disclosed in the cooling device shown in FIG. 3 or in any of the cooling devices disclosed in Patent Documents 1 to 5, and an adequate degree of improvement in the heat transfer coefficient has therefore been difficult to achieve.

The thickness of the boundary layer is inversely proportional to the square root of the flow speed (wind velocity) of the fluid that flows along the surface of a flat plate, and the flow speed (wind velocity) must therefore be markedly increased to obtain the effect of adequate improvement of the heat transfer coefficient. Although the wind velocity can be raised by increasing the rotation rate of the cooling fan, increasing the rotation rate of the cooling fan gives rise to the disadvantage of a loud cooling fan noise.

In addition, the wind velocity can be raised by using a large cooling fan. However, great advances have been achieved in the miniaturization of liquid crystal projectors in recent years, and the use of a large cooling fan is undesirable from the standpoint of miniaturization.

Cooling that can be realized by a cooling fan has limits (limits of air cooling), and a cooling effect that exceeds these limits cannot be anticipated.

Still further, a condition in which a heat transfer coefficient is fixed imposes limits on decreasing the temperature of a flat plate even when the wind velocity realized by a cooling fan is increased. Therefore, it is important to improve the heat transfer coefficient.

In a cooling device of a construction for passing airflow in a fixed direction along the surface of a part that is to be cooled, a construction in which an adequate improvement in the heat transfer coefficient is obtained has yet to be proposed.

Compared to a case in which airflow is formed along the surface of, for example, a liquid crystal panel, a greater cooling effect can be obtained by directing the airflow from, for example, a direction perpendicular to the surface. However, in a construction in which the gap between a liquid crystal panel and sheet polarizer is small, such as in a liquid crystal unit, airflow cannot actually be directed from a perpendicular direction.

It is an object of the present invention to provide a cooling device of an electronic apparatus and a projector device that employs this cooling device that can solve the above-described problems, that enables thinning of a boundary layer, and that can obtain the effect of adequately improving the heat transfer coefficient.

The cooling device of an electronic apparatus of the present invention for achieving the above-described objects is a cooling device of an electronic apparatus that includes a plurality of members juxtaposed such that their surfaces confront each other, the surface of at least one of these members having a heat discharge surface from which heat is discharged, including:

a first air-cooling part equipped with a first opening provided confronting a first side surface of a unit composed of the plurality of members, said first side surface intersecting with a plane that includes the heat discharge surface, wherein the air flow that is emitted from the first opening flows in a first direction toward a reference point set on the heat discharge surface; and a second air-cooling part equipped with a second opening provided confronting a second side surface of the unit, the second side surface being adjacent to the first side surface and intersecting a plane that contains the heat discharge surface, wherein the air flow emitted from the second opening flows toward the reference point in a second direction that intersects with the first direction;

wherein, taking as a boundary a second line that passes through said reference point and that crosses at right angles with a first line that joins the center of the opening width of said first opening in a sectional plane parallel to said heat discharge surface, the center in the opening width of said second opening in a sectional plane parallel to said heat discharge surface is located on the side opposite the side in which said first opening is provided.

The liquid crystal projector of the present invention includes:

a liquid crystal panel;

a first optical element arranged on the incident surface side of the liquid crystal panel;

a second optical element arranged on the emission surface side of the liquid crystal panel;

a first air-cooling part equipped with a first opening provided confronting the first side surface of said liquid crystal panel wherein the air flow emitted from the first opening flows in a first direction toward a reference point set on the incident surface or emission surface of the liquid crystal panel; and a second air-cooling part equipped with a second opening provided confronting the second side surface that is adjacent to the first side surface of the liquid crystal panel wherein air flow emitted from the second opening flows toward the reference point in a second direction that intersects the first direction;

wherein, taking as a boundary a second line that passes through the reference point and that crosses at right angles with a first line that joins the reference point and the center in the opening width of the first opening in a sectional plane that is parallel to the incident surface or emission surface of the liquid crystal panel, the center of the opening width of the second opening in a sectional plane parallel to the incident surface or emission surface of the liquid crystal panel is located on a side opposite the side in which the first opening is provided.

According to the present invention, the direction of flow of the first air flow (first direction) and the direction of flow of the second air flow (second direction) intersect over the heat discharge surface from which heat is discharged, and as a result, the first air flow from the first opening collides with the second air flow from the second opening over the heat discharge surface. The collision of these first and second airflows generates a collision jet that includes a swirl flow (vortex) in a direction perpendicular to the heat discharge surface. This collision jet causes the boundary layer formed on the heat discharge surface to separate (become a thin film) and can thus obtain the effect of adequately improving the heat transfer coefficient.

In addition, because the present invention is configured such that, when viewed from a direction perpendicular to the heat discharge surface and when taking as a boundary a second line that passes through the reference point and that crosses at right angles with a first line that joins the reference point with the center of the opening width of the first opening in a sectional plane parallel to the heat discharge surface, the center of the opening width of the second opening in a sectional plane that is parallel to the heat discharge surface is located on the side that is opposite the side in which the first opening is provided, the first air flow from the first opening and the second air flow from the second opening can be caused to collide at an angle of, for example, 120°. In this case, the collision jet that is generated moves in a predetermined direction over the heat discharge surface. The effect of improving the heat transfer coefficient in a case in which the collision jet moves in this way is greater than for a case in which the collision jet remains in a fixed position and a greater cooling effect can therefore be obtained.

EXPLANATION OF REFERENCE NUMBERS 100, 101 duct
100a, 101a opening
200 liquid crystal panel

BEST MODE FOR CARRYING OUT THE INVENTION

Explanation next regards exemplary embodiments of the present invention with reference to the accompanying figures.

The present invention relates to a cooling device of an electronic apparatus that includes a plurality of members juxtaposed such that their surfaces confront each other, the surface of at least one of these members having a heat discharge surface from which heat is discharged; the cooling device having of a configuration in which: a first air flow that flows over the heat discharge surface in a first direction toward a reference point set on the heat discharge surface and a second air flow that flows over the heat discharge surface toward the reference point in a second direction that intersects with the first direction are generated; these first and, second air flows, by being caused to collide over the heat discharge surface, generate turbulence (a collision jet); and, by appropriate setting of the angle at which the first direction and second direction intersect, the turbulence (collision jet) is caused to move toward a predetermined direction. The reference point is a target point of the position at which the airflows collide, and can be set as appropriate. For example, when the member that is equipped with the heat discharge surface is a liquid crystal panel, the center point of the liquid crystal panel can be taken as the reference point, and the first airflow and second air flow can be caused to collide at the center of the liquid crystal panel.

Details of a turbulence generation construction that can be applied in the cooling device of the present invention and its principals will first be described.

Figure 11:
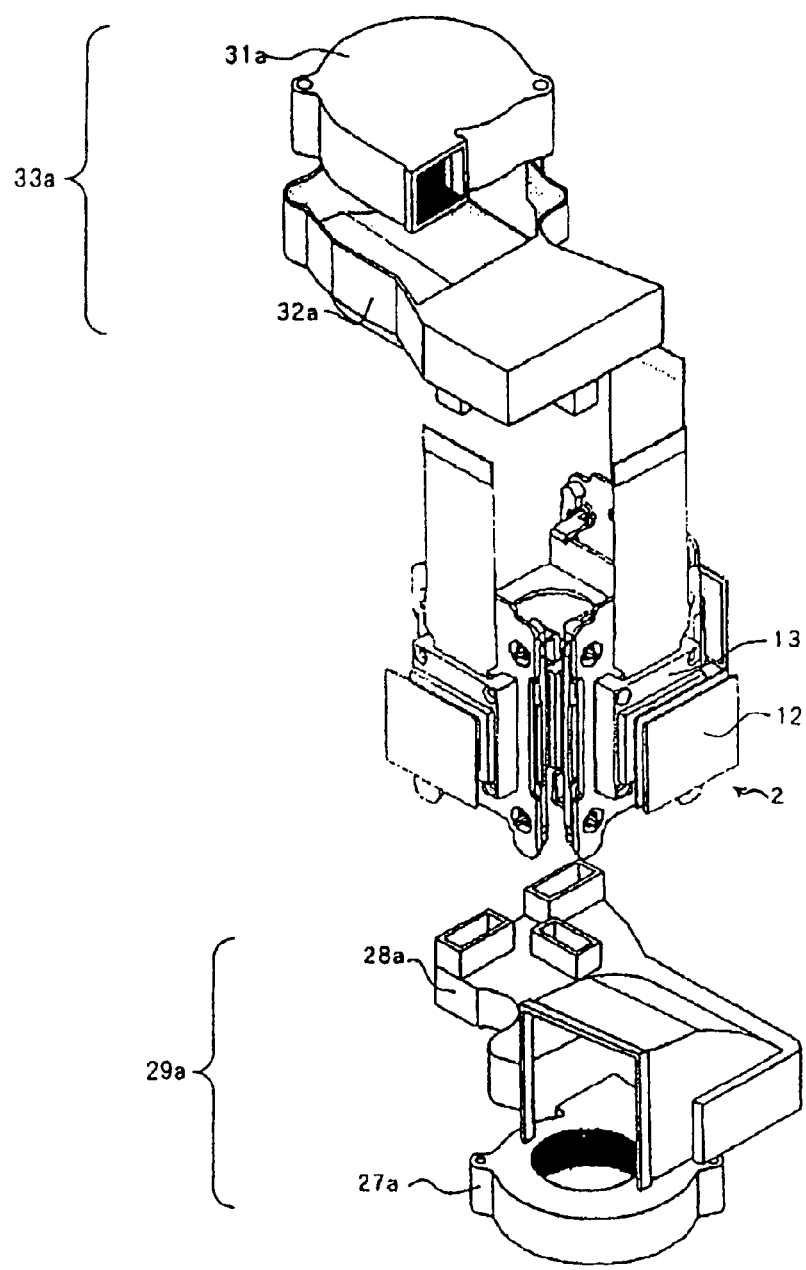
FIG. 11 is an exploded perspective view giving a schematic representation of the configuration of the cooling device equipped with a turbulence generation construction that can be applied to the present invention.
Figure 12:
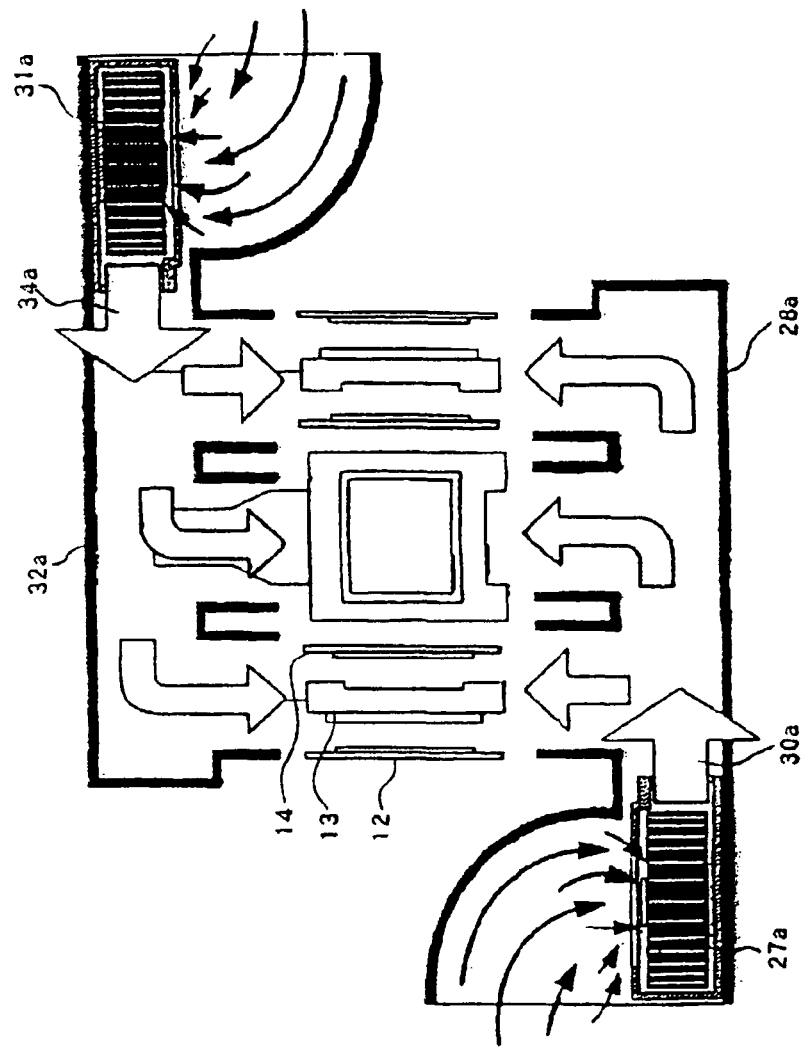
FIG. 12 is a schematic view for explaining the airflow generated by the turbulence generation construction shown in FIG. 11.
Figure 13:
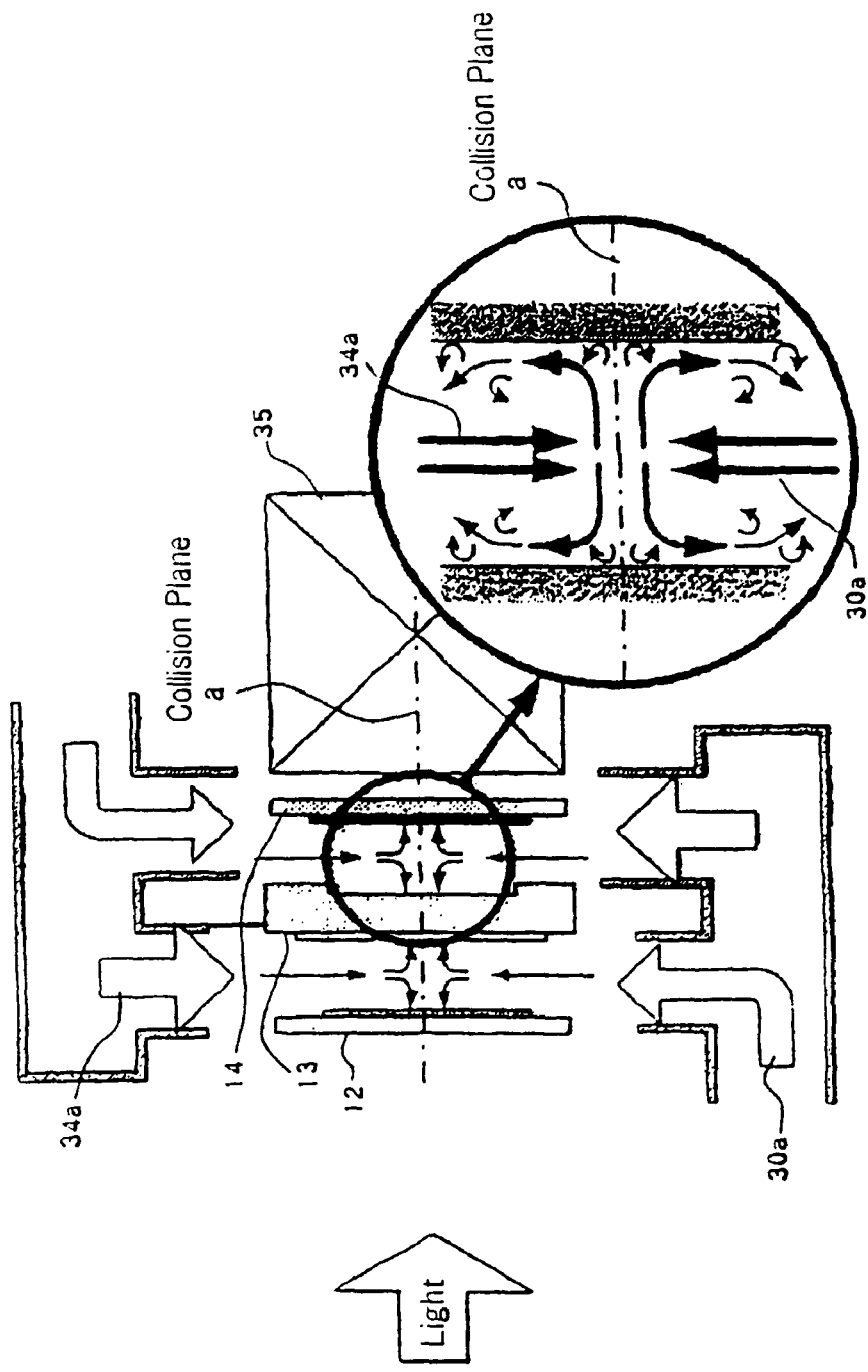
FIG. 13 is a schematic view for explaining the turbulence generation principles in the turbulence generation construction shown in FIG. 11.

FIG. 11 is an exploded perspective view giving a schematic representation of the configuration of a cooling device that has a turbulence generation construction that can be applied in the present invention. FIG. 12 is a schematic view for explaining the airflows that are generated by this turbulence generation construction, and FIG. 13 is a schematic view for explaining the principles of turbulence generation in this turbulence generation construction.

Referring to FIG. 11 and FIG. 12, liquid crystal unit 2 is equipped with three liquid crystal panels 13 provided for each of the colors red (R), green (G) and blue (B). Sheet polarizer 12 is arranged on the incident surface side of each liquid crystal panel 13, and sheet polarizer 14 is arranged on the emission surface side. This liquid crystal unit 2 is equivalent to liquid crystal units incorporated in existing liquid crystal projectors.

The cooling device is made up from air-cooling units 29a and 33a respectively arranged below and above liquid crystal unit 1. Air-cooling unit 29a is made up from cooling fan 27a and cooling duct 28a. Air-cooling unit 33a is made up from cooling fan 31a and cooling duct 32a.

Air-cooling duct 28a extends to the lower end of each liquid crystal panel 13 and is provided with three openings for blowing air toward each liquid crystal panel 13 in the portion located at each lower end. First ventilation air (air flow) 30a generated by cooling fan 27a passes through cooling duct 28a and is directed from each opening toward liquid crystal panel 13 of each color.

Cooling duct 32a extends to the upper end of each liquid crystal panel 13 and is provided with three openings for blowing air toward each liquid crystal panel 13 in the portion located at each upper end. Second ventilation air (air flow) 34a generated by cooling fan 31a passes through cooling duct 32a and is directed from each opening toward liquid crystal panel 13 of each color.

As shown in FIG. 13, each opening of air-cooling duct 28a has a first and second opening separated by a partition. The partition is provided, located opposite to the lower end of liquid crystal panel 13. The first airflow that is blown from the first opening passes between liquid crystal panel 13 and sheet polarizer 12 of the incident side in an upward direction from below. The second airflow that is blown from the second opening passes between liquid crystal panel 13 and sheet polarizer 14 of the emission side in an upward direction from below.

As shown in FIG. 13, each opening of cooling duct 32a also includes a first and second opening separated by a partition. The partition is provided, located opposite to the upper end of liquid crystal panel 13. A third air flow that is blown from the first opening passes between liquid crystal panel 13 and sheet polarizer 12 on the incident side in a downward direction from above. A fourth air flow that is blown from the second opening passes between liquid crystal panel 13 and sheet polarizer 14 on the emission side in a downward direction from above.

In the first air channel between liquid crystal panel 13 and sheet polarizer 12 of the incident side, the third airflow that is directed downward from above collides with the first airflow that is directed upward from below. Similarly, in the second air channel between liquid crystal panel 13 and sheet polarizer 14 of the emission side, the fourth airflow that is directed downward from above collides with the second airflow that is directed upward from below. When the amount of ventilation air of each of cooling fans 27a and 31a is the same and the resistance to fluid on the inner surfaces of each of cooling ducts 28a and 32a is equal, the collision position of the first and third air flows is the middle point of the first air channel (collision plane a in FIG. 13), and the collision position of second and fourth air flows is the middle point of the second air channel (collision plane a in FIG. 13).

In the first air channel, the first and third air flows advance along each of the surfaces of liquid crystal panel 13 and sheet polarizer 12 as far as the collision position. When the first and third air flows collide, a collision jet is produced. Similarly, in the second air channel, the second and fourth air flows advance along each of the surfaces of liquid crystal panel 13 and sheet polarizer 14 as far as the collision position. When the second and fourth air flows collide, a collision jet is produced at that point. These collision jets are the turbulence that accompanies the generation and loss of unstable vortices, and as shown as an enlarged figure in FIG. 13, includes swirl flows (vortices) that are directed to each of the surfaces of liquid crystal panel 13 and sheet polarizer 14 along collision plane a. These swirl flows (vortices) are air flows that strike substantially perpendicularly against each of the surfaces of liquid crystal panel 13 and sheet polarizer 14, and the cooling effect of these swirl flows is greater than for air flows that flow along the surfaces.

Cooling by means of the collision jet contained in the swirl flows (vortices) goes through the following three processes:

1) destruction (separation) of boundary layers formed on the surface;

2) fluid exchange (temperature substitution) realized by swirl flows generated at the collision portion; and 3) wall surface sliding of a jet due to the Coanda effect. Here, fluid exchange (temperature substitution) means the exchange of a particular fluid at a point that is slightly separated from the surface with a fluid close to the surface (temperature substitution). The Coanda effect refers to the property of fluids whereby, when an object is placed within a flow, the pressure between the fluid and the solid walls drops, the flow is pulled toward the wall surfaces, and the direction of the flow is caused to change due to the present of the object within the flow. By means of the above-described three processes, the cooling device shown in FIG. 11 can obtain a cooling capacity that is five to ten times that of a case in which a fluid simply flows along flat plate.

As described hereinabove, the collision jets that are produced in the first and second air channels act to accelerate the radiation of heat from the surfaces of each of liquid crystal panels 13, sheet polarizers 12 and sheet polarizers 14. In other words, the temperature of a fluid that has emerged as a collision jet rises due to the thermal energy discharged from the surface. As a result, when fluid that has emerged as a collision jet remains at the surface, the heat transfer coefficient in some cases drops in the process in which heat is radiated from the surface. Moving fluid that has emerged as a collision jet over the surface can suppress the decrease of the heat transfer coefficient.

The cooling device of the present invention is of a configuration that moves fluid that has emerged as a collision jet in a suitable direction.

Figure 1A:
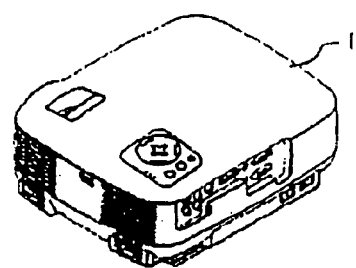
FIG. 1A shows the outside appearance of a liquid crystal projector as an example of the related art.
Figure 1B:
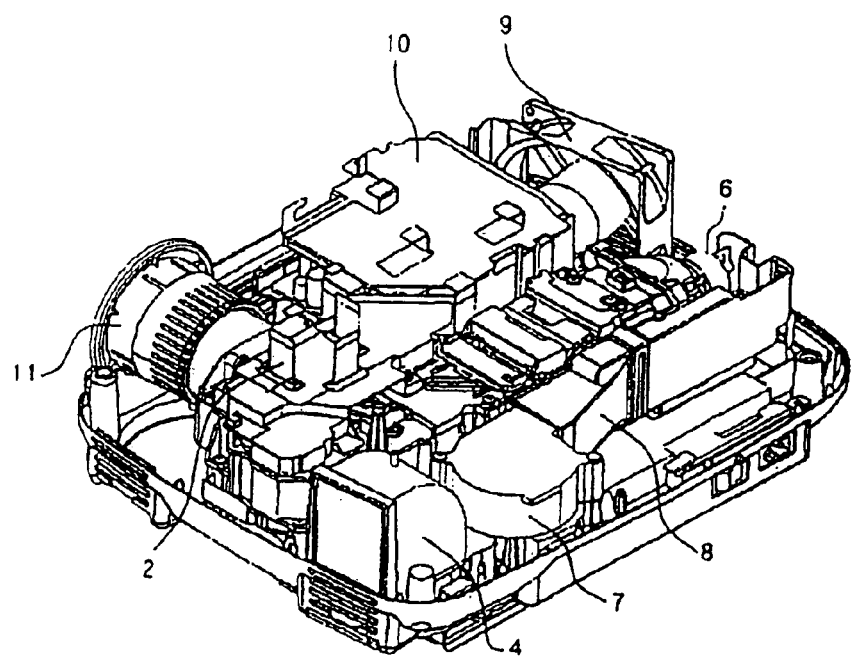
FIG. 1B is a perspective view showing the internal construction of the liquid crystal projector shown in FIG. 1A.
Figure 2:
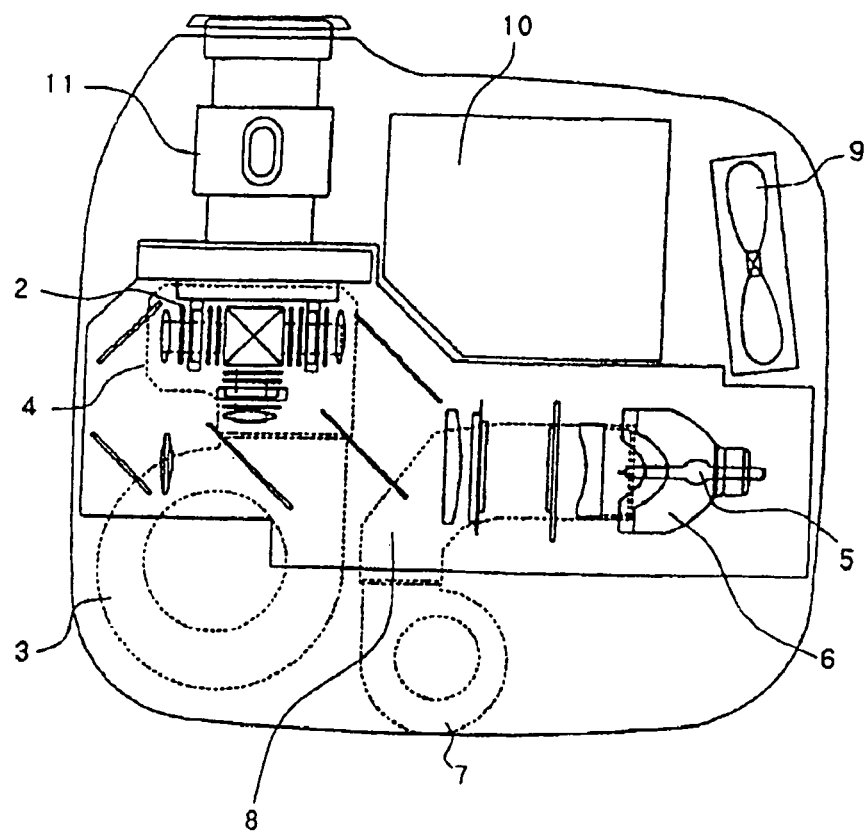
FIG. 2 is a schematic view showing the configuration of a cooling device that is mounted in the liquid crystal projector shown in FIG. 1.
Figure 3A:
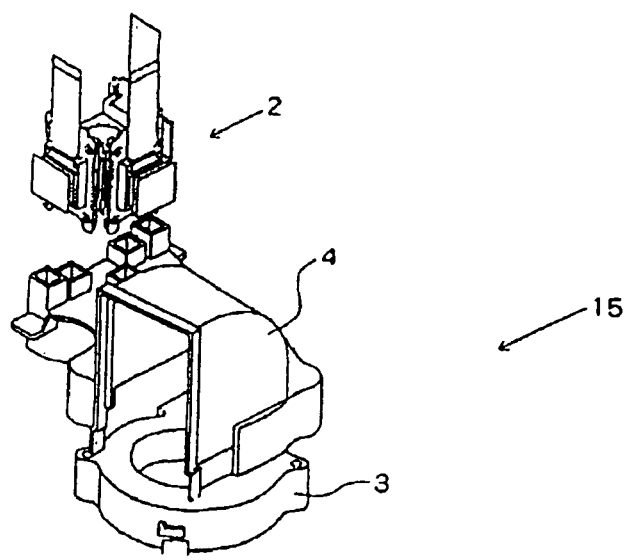
FIG. 3A is an exploded perspective view showing the actual construction of a cooling device for cooling a liquid crystal unit that is mounted in the liquid crystal projector shown in FIG. 1A.
Figure 3B:
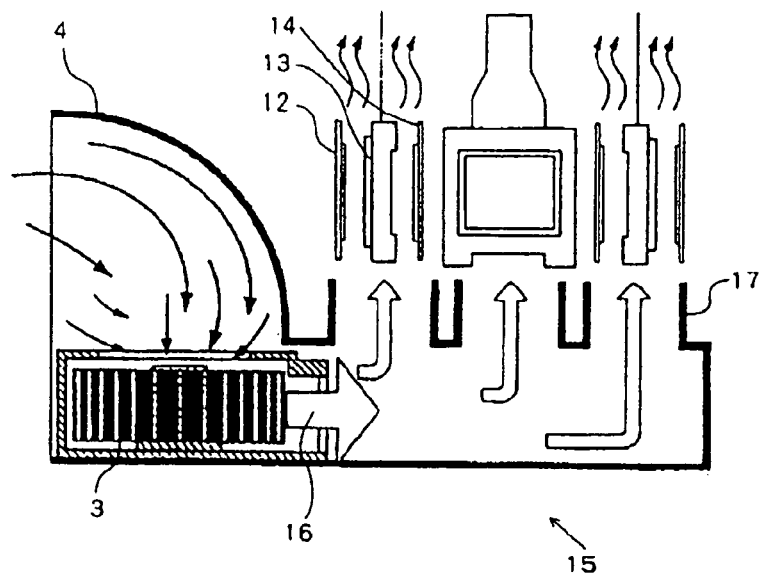
FIG. 3B is a schematic sectional view for explaining the cooling operation shown in FIG. 3A.
Figure 4:
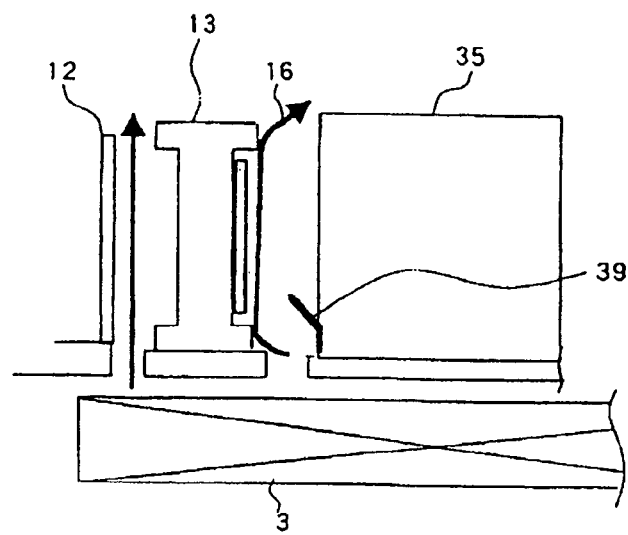
FIG. 4 is a schematic view showing the configuration of the cooling device described in JP-A-H11-295814.
Figure 5:
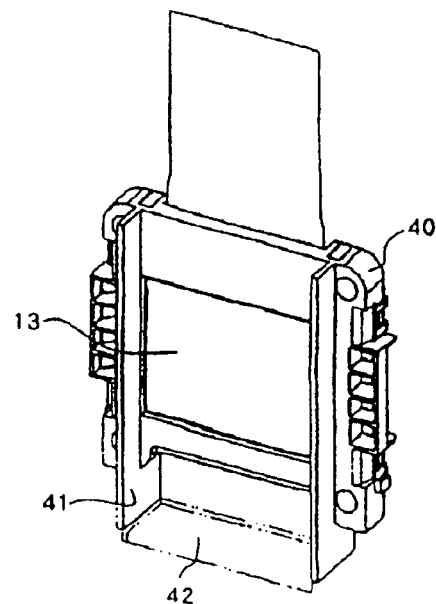
FIG. 5 is a schematic view showing the configuration of the cooling device described in JP-A-2001-318361.
Figure 6:
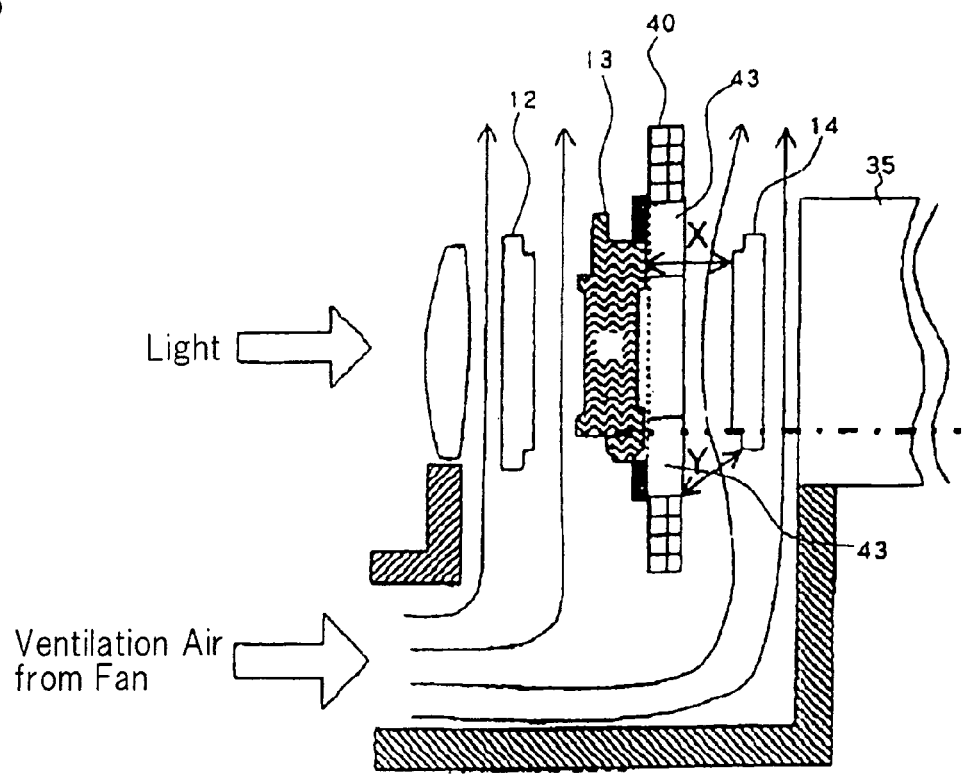
FIG. 6 is a schematic view showing the configuration of the cooling device described in JP-A-2004-061894.
Figure 7A:
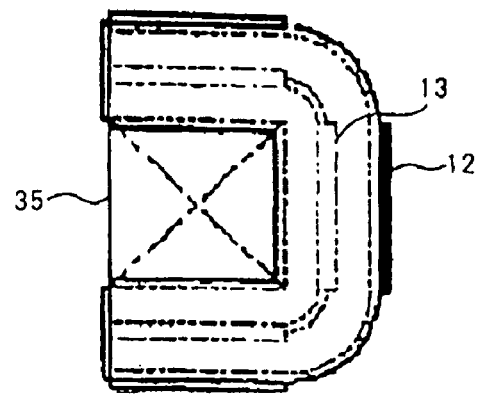
FIG. 7A is a schematic view of the cooling device described in JP-A-2000-124649 when viewed from above.
Figure 7B:
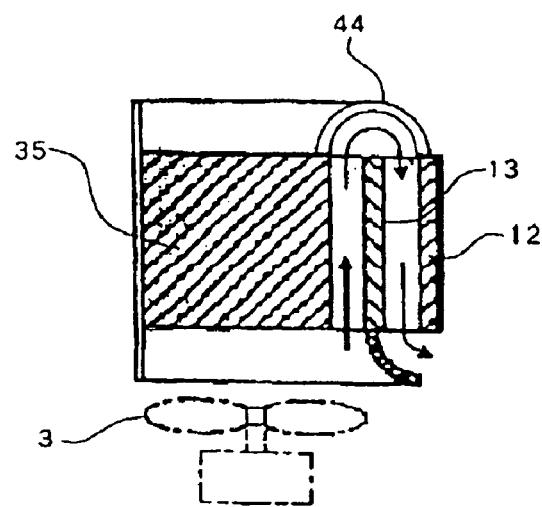
FIG. 7B is a schematic view of the cooling device shown in FIG. 7A when viewed from the side.
Figure 8A:
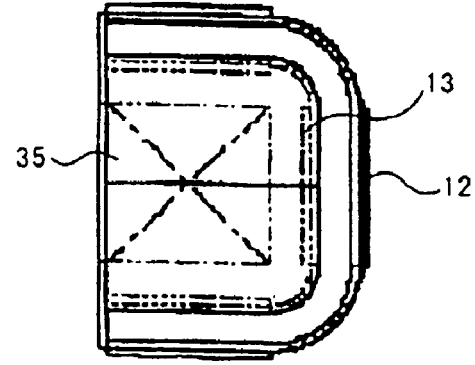
FIG. 8A is a schematic view of another cooling device described in JP-A-2000-124649 when viewed from above.
Figure 8B:
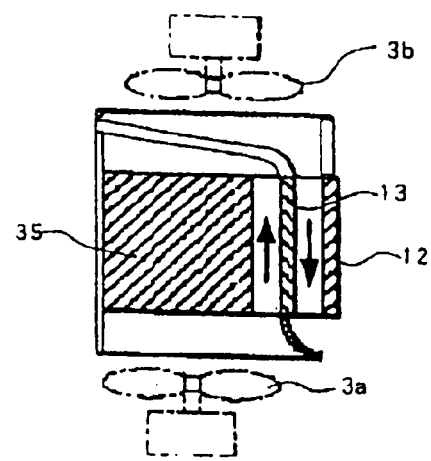
FIG. 8B is a schematic view of the cooling device shown in FIG. 8A when viewed from the side.
Figure 9:
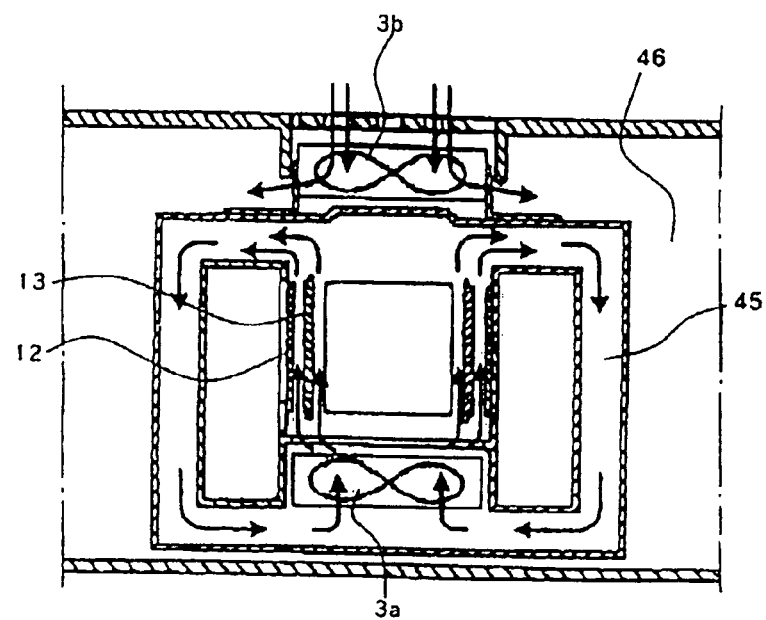
FIG. 9 is a schematic view showing the configuration of another cooling device described in JP-A-2001-209126.
Figure 10:
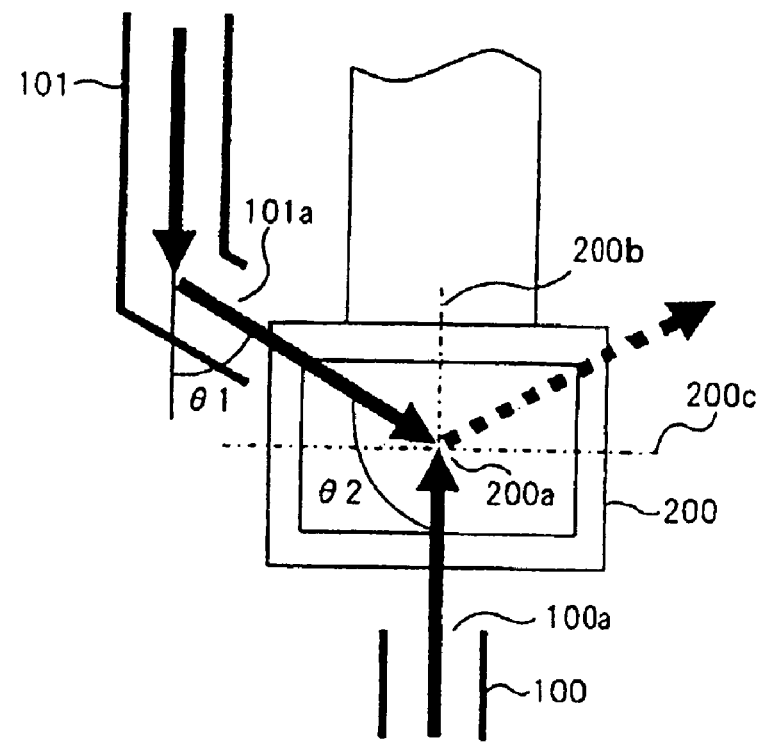
FIG. 10 is a schematic view showing the configuration of a cooling device that is an exemplary embodiment of the present invention.

FIG. 10 is a schematic diagram showing the configuration of a cooling device that is an exemplary embodiment of the present invention.

Referring to FIG. 10, the cooling device includes lower duct 100 that makes up the first cooling unit, and upper duct 101 that makes up the second cooling unit. The surface of liquid crystal panel 200 shown in FIG. 10 is the surface at which light is incident (incident surface). Although not shown in FIG. 10, sheet polarizers are arranged on the near side (incident surface side) and interior side (emission surface side) of the liquid crystal panel as seen looking into the figure.

Lower duct 100 is provided with opening 100a. Opening 100a is provided directed toward a first side surface that intersects with the plane that contains the incident surface or emission surface of liquid crystal panel 200 of the liquid crystal unit. Opening 100a is here located below liquid crystal panel 200, and the airflow (first air flow) from this opening 100a flows over the surface of liquid crystal panel 200 in a first direction along line 200b that passes through center 200a of the surface. Center 200a of the surface of liquid crystal panel 200 here means the center of the display area (the area having picture elements) of the liquid crystal panel, and more specifically, the intersection of the diagonals of the rectangular display area. When viewed from the surface side of liquid crystal panel 200, line 200b is the line (first line) that joins center 200a that is the reference point and the center of the opening width in a sectional plane of opening 100a that is parallel to the surface of liquid crystal panel 200.

Upper duct 101 is provided with opening 101a. Opening 101a is provided directed toward a second side surface of the liquid crystal unit that is adjacent to the above-described first side surface, this second side surface intersecting the plane that includes the incident surface or the emission surface of liquid crystal panel 200. Opening 101a is here located on the upper left of liquid crystal panel 200 as viewed from the incident surface side of liquid crystal panel 200, and the air flow (second air flow) emitted from opening 101a flows over the surface of liquid crystal panel 200 toward center 200a of the surface in a second direction that intersects with the first direction. When viewed from the incident surface side of liquid crystal panel 200, the center of the opening width of opening 101a in a sectional plane parallel to the surface of liquid crystal panel 200 is located above line 200c (second line) that passes through center 200a of the surface of liquid crystal panel 200, and moreover, that crosses at right angles with line 200b. In other words, taking line 200c as a boundary, the center of opening 101a is located on the opposite side from the side in which opening 100a is formed.

In the cooling device of the present embodiment, in order to move a fluid that has emerged as a collision jet, angle θ2 formed by the direction of the first air flow and the direction of the second air flow is set to an angle greater than 90°, for example, 120°. As a result, a fluid that has emerged as a collision jet moves in a diagonal direction toward the upper right over the surface of liquid crystal panel 200 as viewed from the incident surface side of liquid crystal panel 200. The arrow represented by a broken line in FIG. 10 indicates the direction of movement of the collision jet.

When angle θ2 is increased, the cooling effect produced by the collision jet increases, and when angle θ2 is decreased, the cooling effect of the collision jet decreases. In addition, the direction of movement of the collision jet is determined by the speed of flow (wind velocity) and flow rate (air quantity) of the first and second air flows and by angle θ2 formed by the direction of the first air flow and the direction of the second air flow. In the present embodiment, the speed of flow of the first and second air flows and the flow rate (air quantity) are assumed to be the same, and the direction of movement of the collision jet is therefore determined by angle θ2. Because the direction of movement of the collision jet substantially matches the direction of exhausted heat, the direction of heat exhaust can be determined by angle θ2.

According to the cooling device of the present embodiment, generating a collision jet enables the breakdown (conversion to thin film) of the boundary layer. Moving the fluid that has emerged as a collision jet further enables efficient heat exhaust of heat that was captured by the fluid as a collision jet, and to this extent, the cooling effect realized by the collision jet can be augmented. The effect of improving the heat transfer coefficient when a collision jet moves is greater than a case in which the collision jet remains in a fixed location, and a greater cooling effect can therefore be obtained. In other words, thermal conductivity can be improved.

Figure 14:
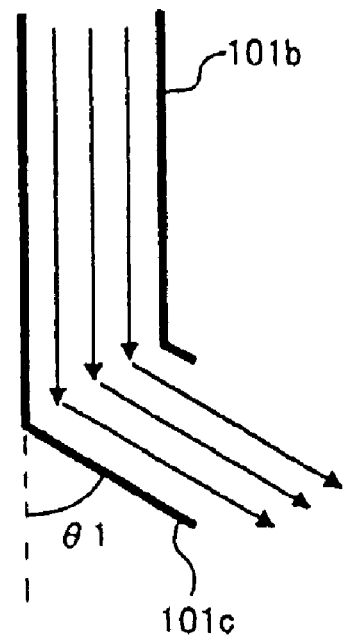
FIG. 14 is a schematic view showing the construction of the end of the upper duct of the cooling device shown in FIG. 10.

As shown in FIG. 14, upper duct 101 is made up from duct part 101b that extends linearly and duct part 101c provided on the end of duct part 101b, duct part 101c being provided at an angle of θ1 with respect to the direction of extension of duct part 101b. However, upper duct 101 is not limited to this construction shown in FIG. 14, any construction being possible as long as the airflow emitted from opening 101a can be directed toward center 200a of liquid crystal panel 200.

Figure 15:
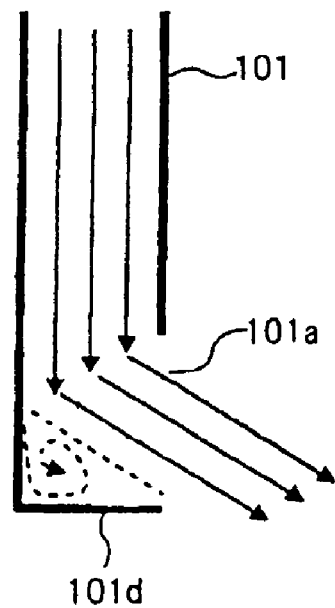
FIG. 15 is a schematic view showing another construction of the end of the upper duct of the cooling device shown in FIG. 10.

FIG. 15 shows another construction of upper duct 101. Upper duct 101 shown in FIG. 15 is a form that extends linearly, the end having wall part 101d provided with a surface that is substantially perpendicular to the direction of advance of the airflow that flows through the duct. Opening 101a is provided to adjoin wall part 101d of the end. The plane of the opening of opening 101a is orthogonal to the surface of wall part 101d of the end.

In upper duct 101 shown in FIG. 15, the airflow that flows through the duct strikes against the surface of wall part 101d of the end and flows outside the duct from opening 101a. At this time, a stagnation of the airflow is produced on the surface of wall part 101d of the end. The height of this area in which stagnation occurs (the area indicated by the broken lines in FIG. 15) from the surface of wall part 101d of the end decreases with approach to the opening 101a side. In other words, the area in which the stagnation occurs has an inclination.

The area in which the stagnation occurs works just like a wall with respect to the airflow. Accordingly, the air flow that flows through the duct flows toward opening 101a along the inclined surface of this area in which stagnation occurs and from there to the duct exterior. The angle formed by the direction of the air flow (second air flow) that flows from this opening 101a and the opening plane coincides with the angle formed by the plane of inclination of the area in which stagnation occurs and the plane of the wall part of the end.

By means of the construction of above-described upper duct 101 as well, the airflow emitted from opening 101a can be directed in the direction of center 200a of liquid crystal panel 200. In the construction shown in FIG. 14, the duct end part protrudes toward liquid crystal panel 200. In contrast, in the construction shown in FIG. 15, there is no protruding part of the duct end portion. The duct end portion can be reduced in size to the extent that a protruding part is lacking, whereby the duct and liquid crystal panel can be arranged in greater proximity.

Figure 16:
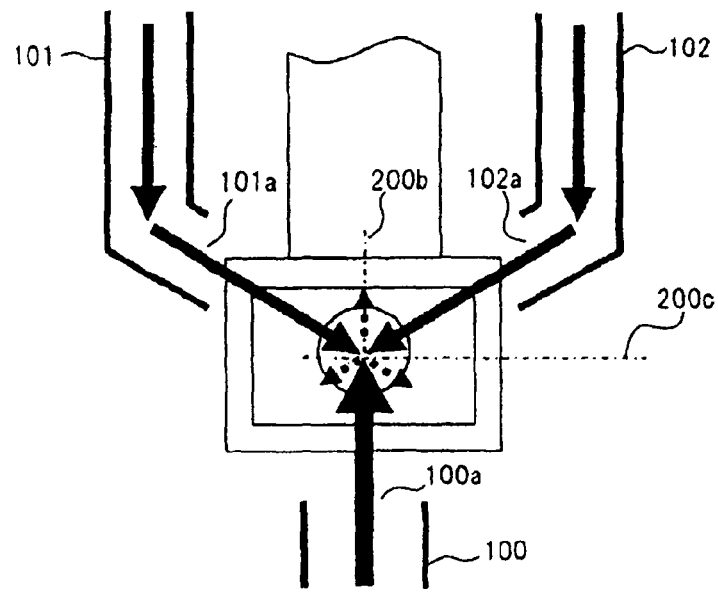
FIG. 16 is a schematic view showing the configuration of a cooling device that is another exemplary embodiment of the present invention.

In the example shown in FIG. 10, the number of upper ducts is just one, but a plurality of upper ducts can also be provided as long as a collision jet can be generated and moved. FIG. 16 shows a cooling device provided with two upper ducts as another exemplary embodiment of the present invention.

Referring to FIG. 16, the cooling device includes upper duct 102 at the upper right of the liquid crystal panel in addition to the configuration shown in FIG. 10. Upper duct 102 is of a construction that has line symmetry with upper duct 101 with line 202b as center.

Upper duct 102 is provided with opening 102a. Opening 102a is provided directed toward a third side surface of the liquid crystal unit that confronts the above-described second side surface, this third side surface intersecting with the plane that includes the incident surface or emission surface of liquid crystal panel 200. Here, opening 102a is located to the upper right of liquid crystal panel when viewed from the side of the surface of liquid crystal panel 200, and the air flow emitted from opening 102a (third air flow) flows over the surface of liquid crystal panel 200 toward center 200a of the surface in a third direction that intersects with the first direction. When viewed from the side of the surface of liquid crystal panel 200, the center of opening 102a is located above line 200c. In other words, taking line 200c as a boundary, the center of the opening width of opening 102a in a sectional plane parallel to the surface of liquid crystal panel 200 is located on the side opposite that in which opening 100a is formed.

According to this embodiment, the first airflow from opening 100a, the second airflow from opening 101a, and the third airflow from opening 102a collide with each other on the surface of liquid crystal panel 200 to produce a collision jet. This collision jet includes a swirl flow that is directed toward the surface of the surface of liquid crystal panel 200 and the sheet polarizers (not shown). When viewed from the side of the surface of liquid crystal panel 200, the fluid that has emerged as a collision jet moves over the surface of liquid crystal panel 200 in three directions: upward, diagonally to the lower left, and diagonally to the lower right. The arrows indicated by broken lines in FIG. 16 show the directions of movement of the collision jet.

Moving the fluid that has thus emerged as a collision jet can effectively discharge the heat that was captured by the fluid in a collision jet and, to this extent, can increase the cooling effect realized by the collision jet. In other words, thermal conductivity can be improved.

According to another exemplary embodiment of the present invention, a cooling device of an electronic apparatus that includes a plurality of members juxtaposed such that their surfaces mutually confront, the surface of at least one member of these members having a heat discharge surface from which heat is discharged, includes a configuration that includes:

a first air-cooling part that is equipped with a first opening provided confronting a first side surface of a unit made up from the plurality of members, this first side surface intersecting with the plane that contains the heat discharge surface, wherein the air flow emitted from the first opening flows in a first direction toward a reference point set on the heat discharge surface; and a second air-cooling part equipped with a second opening provided confronting a second side surface of the unit, the second side surface being adjacent to the first side surface and intersecting with the plane that contains the heat discharge surface, wherein the air flow emitted from the second opening flows toward the reference point in a second direction that intersects with the first direction;

wherein, taking as a boundary a second line that passes through the reference point and that crosses at right angles with a first line that joins the reference point and the center of the opening width of the first opening in a sectional plane parallel to the heat discharge surface, the center of the opening width of the second opening in a sectional plane parallel to the heat discharge surface is located on the side opposite to the side in which the first opening is provided. In this case as well, moving the fluid that has emerged as a collision jet can effectively discharge heat that was captured by the fluid as a collision jet, and to this extent, can increase the cooling effect realized by the collision jet. In other words, thermal conductivity can be improved.

The case described above may be configured to include a third air-cooling part that is equipped with a third opening provided confronting a third side surface of the unit, this third side surface confronting the second side surface and intersecting with the plane that contains the heat discharge surface, wherein the air flow emitted from the third opening flows toward the reference point in a third direction that intersects with the first direction; wherein, taking the second line as a boundary, the center of the opening width of the third opening in a sectional plane parallel to the heat discharge surface is located on the side opposite the side in which the first opening is provided. In this case as well, moving the fluid that has emerged as a collision jet enables efficient discharge of heat that has been captured by the fluid as a collision jet and thus can increase the cooling effect realized by the collision jet. In other words, thermal conductivity can be improved.

In addition, the cooling device may also include a shared cooling fan for supplying air to the first and second air-cooling parts. Sharing the cooling fan enables a reduction of cost.

The first duct that communicates with the first opening and the second duct that communicates with the second opening may communicate with a common intake port.

The opening width of the first opening in a sectional plane parallel to the heat discharge surface may be narrower than the width of the first side surface in a sectional plane parallel to the heat discharge surface.

Still further, the opening width of the second opening in a sectional plane parallel to the heat discharge surface may be narrower than the width of the second side surface in a sectional plane parallel to the heat discharge surface.

At least two ducts among the first duct that communicates with the first opening, the second duct that communicates with the second opening, and the third duct that communicates with the third opening may communicate with a common intake port.

The opening width of the third opening in a sectional plane parallel to the heat discharge surface may be narrower than the width of the third side surface in a sectional plane parallel to the heat discharge surface.

A cooling device according to of each of the embodiments described hereinabove, in addition to the suppression of a decrease in the heat transfer coefficient due to the movement of a collision jet, has the following effects:

Normally, a flexible cable for supplying a drive signal to a liquid crystal panel is provided in the upper portion of a liquid crystal panel. As shown in FIG. 11, in a cooling device in which the opening of the upper duct is located directly over the liquid crystal panel, the problem arises that the opening of the upper duct interferes with the flexible cable. According to each of the embodiments of the present invention as described above, the opening of the upper duct is arranged directed toward the right and left ends of the liquid crystal panel, whereby interference between the opening of the upper duct and the flexible cable can be circumvented.

A liquid crystal projector that incorporates the cooling device of the present invention described above will next be described.

Figure 17:
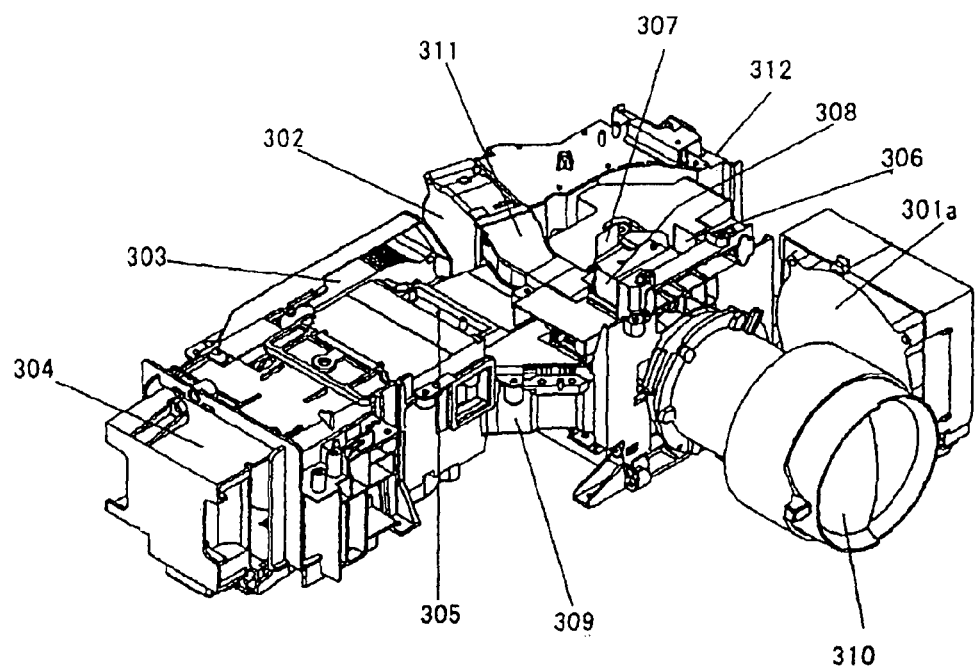
FIG. 17 is a perspective view showing the configuration of the interior of a liquid crystal projector that incorporates the cooling device of the present invention.
Figure 18:
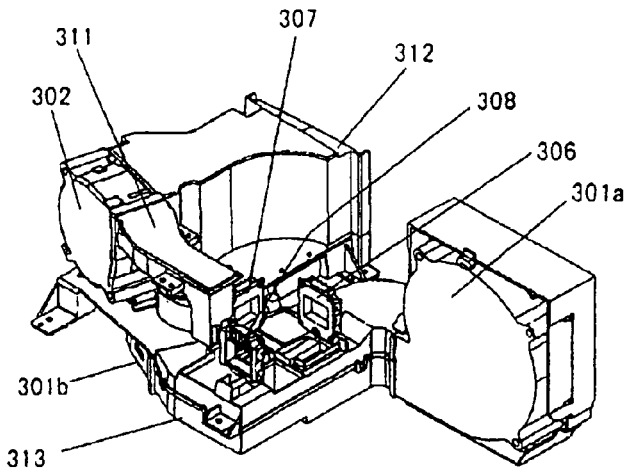
FIG. 18 is a perspective view showing the configuration of each part of the cooling device shown in FIG. 17.

FIG. 17 is a perspective view showing the internal configuration of a liquid crystal projector that incorporates the cooling device of the present invention. FIG. 18 is a perspective view showing the configuration of a portion of the cooling device shown in FIG. 17.

Referring to FIG. 17 and FIG. 18, the liquid crystal projector includes: sirocco fans 301a, 301b, 302, and 303; lamp 304; polarizing beamsplitter (PBS) 305; liquid crystal panels 306-308; optics engine 309, projection lens 310; upper duct 311; intake duct 312; and lower duct 313.

PBS 305 is disposed in the direction of advance of the luminous flux emitted from lamp 304. PBS 305 adjusts the polarization of light from lamp 304. A color separation unit (not shown) made up from a plurality of dichroic mirrors is arranged in the direction of advance of luminous flux that has passed through PBS 305. The color separation unit separates incident luminous flux into each of the colors of red (R), green (G), and blue (B).

Sheet polarizers are provided on each of the incident surface sides and emission surface sides of liquid crystal panels 306-308. These liquid crystal panels 306-308 and sheet polarizers are secured onto optics engine 309 by way of a retention structure. Of the luminous flux that is color-separated by the color separation unit, the red (R) luminous flux is irradiated to liquid crystal panel 306, the green (G) luminous flux is irradiated to liquid crystal panel 307, and the blue (B) luminous flux is irradiated to liquid crystal panel 308. The luminous flux of each color that has passed through liquid crystal panels 306-308 is color-synthesized in color-synthesizing prism (not shown) and then directed into projection lens 310.

Sirocco fan 303 is for cooling lamp 304. Sirocco fan 301a takes in outside air from an intake port provided on the case side surface. Sirocco fan 301b takes in outside air by way of intake duct 312. The output ports of sirocco fans 301a and 301b communicate with lower duct 313, and the airflows generated by sirocco fans 301a and 301b are supplied through lower duct 313 to liquid crystal panels 306-308.

The intake port of sirocco fan 302 communicates with intake duct 312. Sirocco fan 302, similar to sirocco fan 301b, takes in outside air by way of intake duct 312. The output port of sirocco fan 302 communicates with upper duct 311, and the airflow generated by sirocco fan 302 is supplied through upper duct 311 to liquid crystal panel 308.

Figure 19:
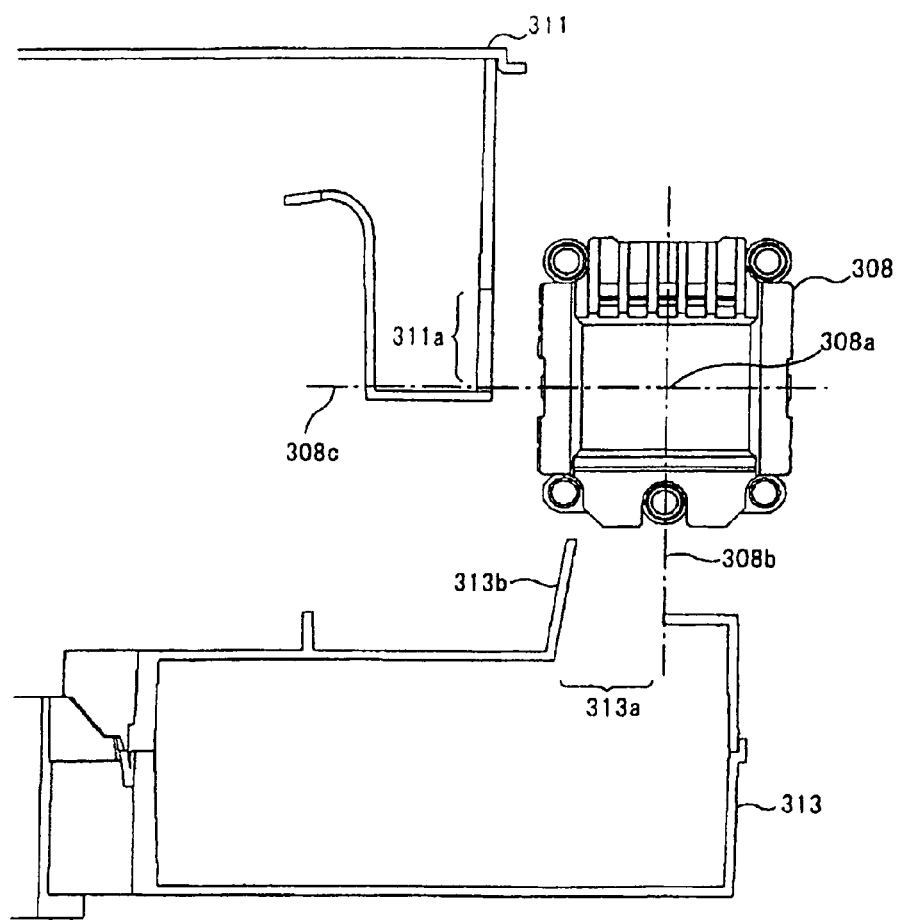
FIG. 19 is a schematic view showing the positional relation between the upper duct, the lower duct, and the liquid crystal panel in the liquid crystal projector shown in FIG. 17.

FIG. 19 gives a schematic representation of the positional relation between upper duct 311, lower duct 313, and liquid crystal panel 308 as viewed from the light-incidence side of liquid crystal panel 308.

As shown in FIG. 19, lower duct 313 is equipped with opening 313a. Opening 313a is located below liquid crystal panel 308. When viewed from the light-incidence side of liquid crystal panel 308, the center of the opening width of opening 313a in a sectional plane parallel to the surface of liquid crystal panel 308 is located to the left from line 308b that passes through center 308a of the surface of liquid crystal panel 308. Plate part 313b is provided in opening 313a for directing the air flow emitted from opening 313a toward center 308a of the surface of liquid crystal panel 308. This plate part 313b limits the output direction of airflow from opening 313a. As a result, the airflow emitted from opening 313a (first air flow) flows over the surface of liquid crystal panel 308 in a first direction toward center 308a of liquid crystal panel 308.

Upper duct 311 is a component similar to the duct structure shown in FIG. 15, and is equipped with opening 311a. Opening 311a is located on the upper left of liquid crystal panel 308 when viewed from the light-incidence side of liquid crystal panel 308, and the air flow emitted from opening 311a (second air flow) flows over the surface of liquid crystal panel 308 toward center 308a in a second direction that intersects with the first direction. When viewed from the light-incidence side of liquid crystal panel 308, the center of the opening width of opening 311a in a sectional plane parallel to the surface of liquid crystal panel 308 is located above line 308c that passes through center 308a of the surface of liquid crystal panel 308, and moreover, that crosses at right angles with line 308b.

The first air flow from opening 313a and the second air flow from opening 311a collide on the surface of liquid crystal panel 308 and produce a collision jet. This collision jet includes swirl flows directed toward the each of the surfaces of the surface of liquid crystal panel 308 and the surfaces of sheet polarizers that confront these surfaces. Fluid that has emerged a collision jet moves in a diagonal direction toward the upper right over the surface of liquid crystal panel 308 when viewed from the surface side of liquid crystal panel 308. Heat that has been captured from liquid crystal panel 308 by the fluid as a collision jet can thus be efficiently discharged, and the cooling effect can be increased to this extent. In other words, thermal conductivity can be improved.

In the liquid crystal projectors shown in FIGS. 17 to 19, upper duct 311 is formed only on liquid crystal panel 308 for blue, and this is because the amount of heat discharge in liquid crystal panel 308 for blue is greater than in the other liquid crystal panels 306 and 307 due to the differences of the light energy of the incident light.

Figure 20:
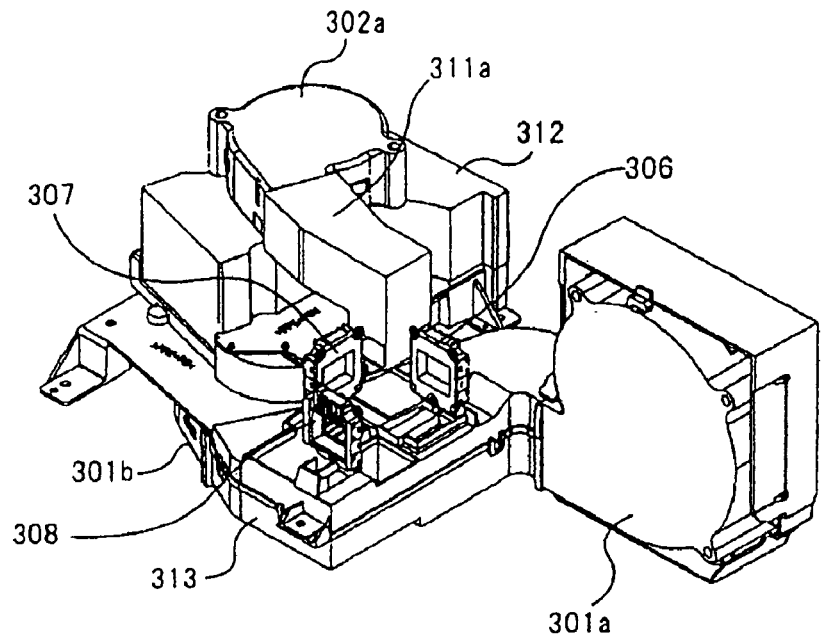
FIG. 20 is a schematic view showing the configuration of the cooling device in which an upper duct is provided on the liquid crystal panel for green (G), this being an application of the present invention.

An upper duct can also be provided for liquid crystal panel 307 for green (G). FIG. 20 shows the configuration of a cooling device in which an upper duct is provided in the liquid crystal panel for green (G).

Referring to FIG. 20, the cooling device is equivalent to the configuration shown in FIG. 18 with the exception of the provision of a cooling unit composed of upper duct 311a and sirocco fan 302a in place of the cooling unit composed of upper duct 311 and sirocco fan 302.

The intake port of sirocco fan 302a communicates with intake duct 312. Sirocco fan 302a also takes in outside air by way of intake duct 312 similar to sirocco fan 302. The output port of sirocco fan 302a communicates with upper duct 311a. The airflow generated by sirocco fan 302a is supplied by way of upper duct 311a to liquid crystal panel 307. When viewed from the side of liquid crystal panel 307 from which light is incident, the positional relations of upper duct 311a, lower duct 313, and liquid crystal panel 307 are basically the same as the positional relations shown in FIG. 19. Upper duct 311a is located on the upper left of liquid crystal panel 307.

The first air flow from lower duct 313 and the second air flow from upper duct 311a collide on the surface of liquid crystal panel 307 and produce a collision jet. This collision jet contains swirl flows directed toward each of the surface of liquid crystal panel 307 and the surfaces of sheet polarizer that confront this surface. Fluid that has emerged as a collision jet moves over the surface of liquid crystal panel 307 in a diagonal direction toward the upper right when viewed from the surface side of liquid crystal panel 307. As a result, heat that is captured from the surface of liquid crystal panel 307 by the fluid as a collision jet can be effectively discharged, and the cooling effect can be augmented to this extent. In other words, thermal conductivity can be improved.

Figure 21:
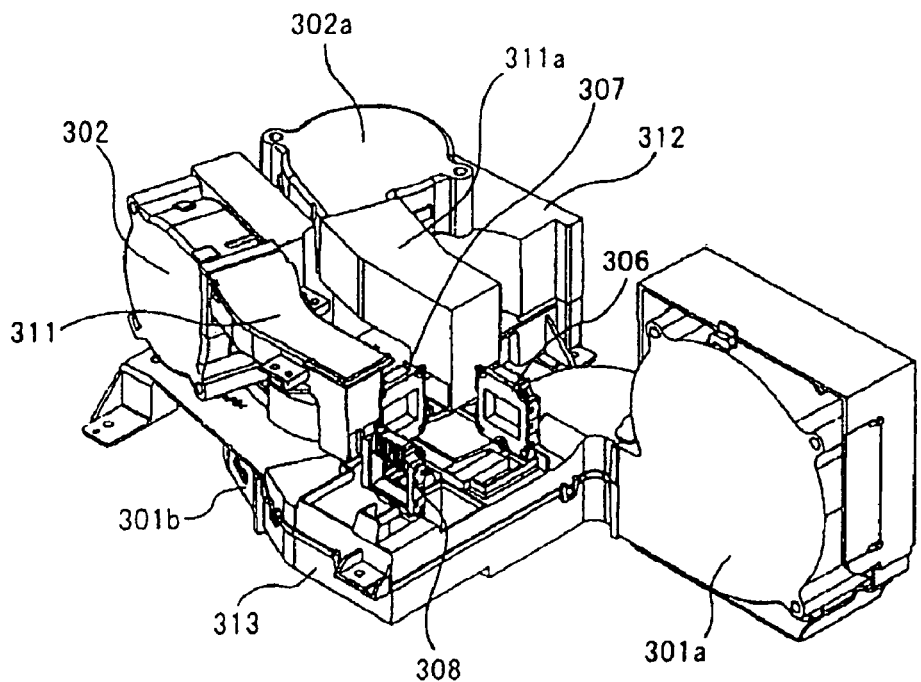
FIG. 21 is a schematic view showing the configuration of a cooling device in which upper ducts are provided on liquid crystal panels for both green and blue, this being an example of the application of the present invention.

In addition, upper ducts can be provided for both liquid crystal panel 307 for green and liquid crystal panel 308 for blue. FIG. 21 shows the configuration of a cooling device in which upper ducts are provided for both liquid crystal panels 307 and 308 for green and blue.

Referring to FIG. 21, the cooling device has a configuration in which a cooling unit composed upper duct 311a and sirocco fan 302a shown in FIG. 20 is added to the configuration shown in FIG. 18.

According to this cooling device, a first air flow from lower duct 313 and a second air flow from upper duct 311 collide on the surface of liquid crystal panel 308 and produce a collision jet. The collision jet that is produced then moves over the surface of liquid crystal panel 308 in a diagonal direction toward the upper right. Similarly, the first airflow from lower duct 313 and the second air flow from upper duct 311a collide over the surface of liquid crystal panel 307 and produce a collision jet. This collision jet moves over the surface of liquid crystal panel 307 in a diagonal direction toward the upper right. As a result, the heat captured by the fluid as a collision jet from the surfaces of liquid crystal panels 307 and 308 and the surfaces of sheet polarizer can be effectively discharged, and the cooling effect can be increased to this extent. In other words, thermal conductivity can be improved.

In the examples shown in FIGS. 17 to 21, upper ducts are provided for the liquid crystal panel for blue, the liquid crystal panel for green, or for both liquid crystal panels, but an upper duct may also be provided for the liquid crystal panel for red.

According to the liquid crystal projector in which the cooling device of the above-described present invention is applied, upper ducts are arranged in spaces free of obstructions such as flexible cables, flanges, and optical engines that are provided adjacent to liquid crystal panel and. In addition, the first airflow and the second airflow are generated on the surface of a liquid crystal panel and the collision jet produced by these airflows is moved in a direction in which there are no obstructions. As a result, return currents of heated air as cooling air can be avoided to achieve an increase in the liquid crystal panel cooling effect.

In a liquid crystal projector in which the cooling device of the present invention has been applied, the opening of an upper duct may be provided with at least one partition for dividing the opening into a plurality of openings. FIG. 22 shows the construction of an upper duct having this type of partition.

Figure 22A:
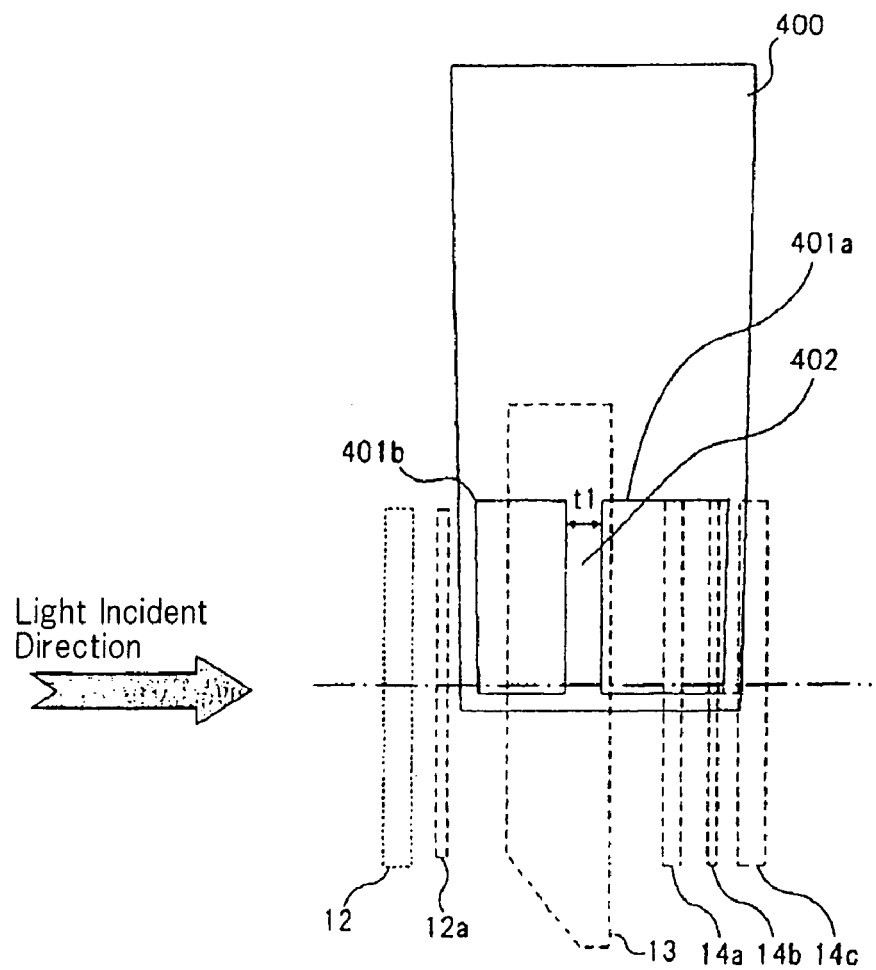
FIG. 22A is a schematic view showing the configuration of an upper duct having a partition plate.
Figure 22B:
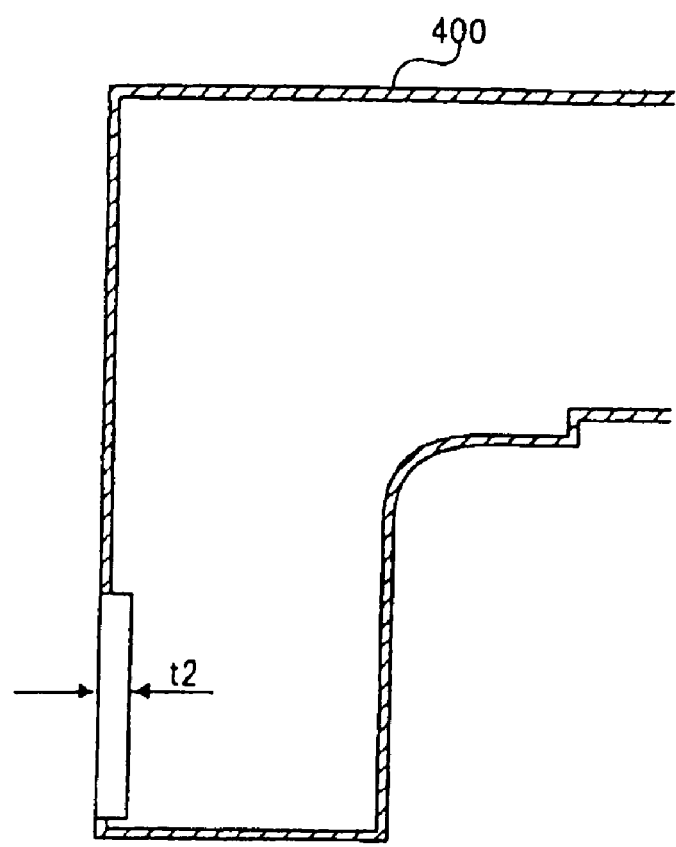
FIG. 22B is a side view of the upper duct shown in FIG. 22A.

FIG. 22A is a schematic view viewed from the side of the surface in which an opening of the upper duct is provided, and FIG. 22B is a side view of the upper duct. Upper duct 400 is upper duct 101 shown in FIG. 10 or upper duct 102 shown in FIG. 16, and the portion that is opened (opening 101a or opening 102a) has two openings 401a and 401b separated by partition 402. Partition 402 is provided in a position that confronts the end of liquid crystal panel 13.

Sheet polarizer 12 and optical compensation plate 12a are arranged on the incident surface side of liquid crystal panel 13. Analyzers 14a, 14b, and 14c are arranged on the emission surface side of liquid crystal panel 13. The spacing of sheet polarizer 12 and optical compensation plate 12a is 1.5 mm. The spacing of optical compensation plate 12a and liquid crystal panel 13 is 3.3 mm. The spacing of liquid crystal panel 13 and analyzer 14a is 3.1 mm. The spacing of analyzer 14a and analyzer 14b is 1.5 mm. The spacing of analyzer 14b and analyzer 14c is 1.0 mm.

The thickness of liquid crystal panel 13 is 5.7 mm, the thickness of optical compensation plate 12a is 0.7 mm. The thicknesses of analyzers 14a, 14b, and 14c are 1.0 mm, 0.5 mm, and 1.5 mm, respectively. The width t1 of partition 402 is 2 mm, and thickness t2 is 1.5 mm. The width of opening 401a is 5.1 mm, and the width of opening 401b is 8.1 mm.

Providing partition 402 in the opening portion of upper duct 400 increases the flow speed (wind velocity) of the airflows emitted from openings 401a and 401b compared to a case in which partition is not provided.

Because liquid crystal panel 13 has a thickness of 5.7 mm, there is a concern that when partition 402 is not provided in the opening portion of upper duct 400, the end of this liquid crystal panel 13 will present resistance to the airflow from the opening and thus lower the cooling effect.

Providing partition 402 in the opening portion of upper duct 400 increases the flow speed (wind velocity) of the airflow emitted from openings 401a and 401b compared to a case in which partition 402 is not provided. The airflow from opening 401a passes between each of liquid crystal panel 13 and analyzers 14a, 14b, and 14c. The airflow from opening 401b passes between each of liquid crystal panel 13, sheet polarizer 12, and optical compensation plate 12a. In this way, cooling can be effected by an airflow having a higher flow speed (wind velocity). In addition, the thicknesses of sheet polarizer 12, optical compensation plate 12a, analyzers 14a, 14b and 14c are sufficiently thinner than that of liquid crystal panel 13, whereby the resistance against air flow presented by each of the ends of sheet polarizer 12, optical compensation plate 12a, and analyzers 14a, 14b, and 14c is not problematic.

The cooling device of the present invention described hereinabove is not limited to a liquid crystal unit and can be applied to an electronic apparatus having a plurality of members juxtaposed with mutually confronting surfaces, the surface of at least one member of these members having a heat discharge surface from which heat is discharged. Examples of an electronic apparatus for application include a rack unit in which a plurality of printed circuit boards are mounted arranged in a row and a compact electronic apparatus in which an IC chip substrate is packaged inside a case.

Alternatively, in a liquid crystal projector in which the cooling device of the present invention is applied, an optical element composed of one or a combination of any of a sheet polarizer, phase-shift plate, or optical compensation plate may be provided on each incident surface side and each emission surface side of a liquid crystal panel. In this case, the liquid crystal unit is composed of the liquid crystal panel and optical elements.

Although the present invention has been described hereinabove with reference to embodiments, the present invention is not limited to the above-described embodiments. The configuration and operation of the present invention is open to various modifications within a scope that does not depart from the gist of the present invention and that will be readily understood by one of ordinary skill in the art.

This application claims priority based on Japanese Patent Application 2007-262206 for which application was submitted on Oct. 5, 2007 and incorporates all of the disclosures of that application.

What is claimed is:

1. A cooling device of an electronic apparatus that includes a plurality of members juxtaposed such that their surfaces confront each other, the surface of at least one of the members comprising a heat discharge surface from which heat is discharged, said cooling device comprising:
   a first air-cooling part equipped with a first opening provided confronting a first side surface of a unit that includes said plurality of members, said first side surface intersecting with a plane that contains said heat discharge surface, wherein a first air flow emitted from said first opening flows in a first direction toward a reference point set on said heat discharge surface;
   a second air-cooling part equipped with a second opening provided confronting a second side surface of said unit, said second side surface being adjacent to said first side surface and intersecting with a plane that contains said heat discharge surface, wherein a second air flow emitted from said second opening flows toward said reference point in a second direction that intersects with said first direction;
   a first duct that communicates with said first opening; and
   a second duct that communicates with said second opening,
   wherein, taking as a boundary a second line that passes through said reference point and that crosses at right angles with a first line that joins said reference point and a center of an opening width of said first opening in a sectional plane parallel to said heat discharge surface, a center in an opening width of said second opening in a sectional plane parallel to said heat discharge surface is located on a side opposite the side in which said first opening is provided,
   wherein said second duct is configured to extend along said second side surface, an end of said second duct including a wall part provided with a surface that is perpendicular to a direction of an advance of an air flow that flows through the second duct, and
   wherein said second opening is provided to adjoin said wall part of the end of said second duct.

2. The cooling device of an electronic apparatus according to claim 1, further comprising:
   a third air-cooling part equipped with a third opening provided confronting a third side surface of said unit, said third side surface confronting said second side surface and intersecting the plane that contains said heat discharge surface,
   wherein a third air flow emitted from said third opening flows toward said reference point in a third direction that intersects said first direction, and
   wherein, taking said second line as a boundary, a center in an opening width of said third opening in a sectional plane parallel to said heat discharge surface is located on the side opposite the side in which said first opening is provided.

3. The cooling device of an electronic apparatus according to claim 2, wherein, taking said first line as a reference, said second and third openings are arranged at positions that are in line symmetry.

4. The cooling device of an electronic apparatus according to claim 1, further comprising:
   at least one partition that divides said second opening into a plurality of openings,
   wherein said partition is provided at a position of a surface in which said second opening is formed, said position confronting an end of at least one member of said plurality of members.

5. The cooling device of an electronic apparatus according to claim 1, further comprising a common cooling fan that supplies air to said first and second air-cooling parts.

6. The cooling device of an electronic apparatus according to claim 1,
   wherein said first and second ducts communicate with a common intake port.

7. The cooling device of an electronic apparatus according to claim 1, wherein the opening width of said first opening in a sectional plane parallel to said heat discharge surface is narrower than a width of said first side surface in a sectional plane parallel to said heat discharge surface.

8. The cooling device of an electronic apparatus according to claim 1, wherein the opening width of said second opening in a sectional plane parallel to said heat discharge surface is narrower than a width of said second side surface in a sectional plane parallel to said heat discharge surface.

9. The cooling device of an electronic apparatus according to claim 2, further comprising:
   at least one partition that divides said third opening into a plurality of openings,
   wherein said partition is provided in a position of a surface in which said third opening is formed, said position confronting an end of at least one member of said plurality of members.

10. The cooling device of an electronic apparatus according to claim 2, further comprising a common cooling fan that supplies air to at least two air-cooling parts among said first to third air-cooling parts.

11. The cooling device of an electronic apparatus according to claim 2, further comprising:
    a third duct that communicates with said third opening,
    wherein at least two ducts among said first to third ducts communicate with a common intake port.

12. The cooling device of an electronic apparatus according to claim 2, wherein the opening width of said third opening in a sectional plane parallel to said heat discharge surface is narrower than a width of said third side surface in the sectional plane parallel to said heat discharge surface.

13. The cooling device of an electronic apparatus according to claim 1, wherein said plurality of members comprises a liquid crystal panel and first and second optical elements arranged on each of an incident surface side and an emission surface side of said liquid crystal panel, and wherein said first and second openings are provided directed toward adjacent ends of said liquid crystal panel.

14. The cooling device of an electronic apparatus according to claim 13, wherein:
said liquid crystal panel includes a first end in which a flexible cable to which a drive signal is supplied is provided;
said first opening is provided confronting a second end that is opposite said first end of said liquid crystal panel; and
said second opening is provided confronting a third end that is adjacent to said first end of said liquid crystal panel.

15. The cooling device of an electronic apparatus according to claim 13, wherein at least one of said first and second optical elements comprises one of or a combination of a sheet polarizer, a phase shift plate, and an optical compensation plate.

16. A liquid crystal projector, comprising:
a liquid crystal panel;
a first optical element arranged on an incident surface side of said liquid crystal panel;
a second optical element arranged on an emission surface side of said liquid crystal panel;
a first air-cooling part equipped with a first opening provided confronting a lower part of said liquid crystal panel wherein a first air flow emitted from said first opening flows in a first direction toward a reference point set on the incident surface or the emission surface of said liquid crystal panel;
a second air-cooling part equipped with a second opening provided confronting a side surface that is adjacent to said lower part of said liquid crystal panel wherein a second air flow emitted from said second opening flows toward said reference point in a second direction that intersects said first direction;
a first duct that communicate with said first opening; and
a second duct that communicates with said second opening,
wherein, taking as a boundary a second line that passes through said reference point and that crosses at right angles with a first line that joins said reference point and a center in an opening width of said first opening in a sectional plane that is parallel to the incident surface or the emission surface of said liquid crystal panel, a center of an opening width of said second opening in a sectional plane parallel to the incident surface or the emission surface of said liquid crystal panel is located on a side opposite the side in which said first opening is provided,
wherein said second duct is configured to extend along said side surface, an end of said second duct including a wall part provided with a surface that is perpendicular to a direction of an advance of an air flow that flows through the second duct, and
wherein said second opening provided to adjoin said wall part of the end of said second duct.

17. The liquid crystal projector according to claim 16, further comprising:
a third air-cooling part equipped with a third opening provided confronting another side surface opposite said side surface of said liquid crystal panel wherein a third air flow emitted from said third opening flows toward said reference point in a third direction that intersects said first direction;
wherein, taking said second line as a boundary, a center of an opening width of said third opening in a sectional plane parallel to the incident surface or emission surface of said liquid crystal panel is located on a side opposite the side in which said first opening is provided.

18. The liquid crystal projector according to claim 16, wherein, taking said first line as a reference, said second and third openings are arranged at positions in line symmetry.

19. The liquid crystal projector according to claim 16, wherein at least one of said first and second optical elements comprises one or a combination of a sheet polarizer, a phase shift plate, and an optical compensation plate.

20. The cooling device of an electronic apparatus according to claim 1, wherein an opening plane of said second opening is orthogonal to the surface of said wall part.

21. The cooling device of an electronic apparatus according to claim 1, wherein a speed of flow of said first air flow is equal to that of said second air flow and a flow rate of said first air flow is equal to that of said second air flow.

22. The liquid crystal projector according to claim 16, wherein an opening plane of said second opening is orthogonal to the surface of said wall part.

23. The liquid crystal projector according to claim 16, wherein a speed of flow of said first air flow is equal to that of said second air flow and a flow rate of said first air flow is equal to that of said second air flow.

24. A cooling method for an electronic apparatus that includes a plurality of members juxtaposed such that their surfaces confront each other, the surface of at least one of the members comprising a heat discharge surface from which heat is discharged, said method comprising:
generating a first air flow which flows, in a first direction, toward a reference point set on said heat discharge surface from a first side surface of a unit that includes said plurality of members;
generating a second air flow which flows, in a second direction that intersects said first direction, toward said reference point from a second side surface of said unit that is adjacent to said first side surface and that intersects a plane that contains said heat discharge surface;
generating a collision jet by causing said first and second air flows to collide over both said reference point and a region close to said reference point; and
causing said collision jet to move.

25. The cooling method according to claim 24, wherein said collision jet is moved in a direction in which there are no obstructions.

26. The cooling method according to claim 24, wherein a speed of flow of said first air flow is equal to that of said second air flow and a flow rate of said first air flow is equal to that of said second air flow.

27. A cooling method for a liquid crystal projector that includes a liquid crystal panel, a first optical element arranged on an incident surface side of said liquid crystal panel, and a second optical element arranged on an emission surface side of said liquid crystal panel, wherein at least one among said liquid crystal panel, said first optical element, and said second optical element is cooled, said method comprising:
generating a first air flow which flows toward a reference point set on the incident surface or the emission surface of said liquid crystal panel from a first side surface of said liquid crystal panel;
generating a second air flow which flows toward said reference point from a second side surface of said liquid crystal panel that is adjacent to said first side surface;
generating a collision jet by causing said first and second air flows to collide over both said reference point and a region close to said reference point; and
causing said collision jet to move over the incident surface or the emission surface of said liquid crystal panel.

28. The cooling method according to claim 27, wherein said reference point comprises a center point of said liquid crystal panel.

29. The cooling method according to claim 27. wherein a speed of flow of said first air flow is equal to that of said second air flow and a flow rate of said first air flow is equal to that of said second air flow.

* * * * *